(12) United States Patent
Little et al.

(10) Patent No.: US 9,291,063 B2
(45) Date of Patent: Mar. 22, 2016

(54) MID-SECTION OF A CAN-ANNULAR GAS TURBINE ENGINE WITH AN IMPROVED ROTATION OF AIR FLOW FROM THE COMPRESSOR TO THE TURBINE

(75) Inventors: David A. Little, Chuluota, FL (US); Reinhard Schilp, Orlando, FL (US); Christopher W. Ross, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 518 days.

(21) Appl. No.: 13/408,287

(22) Filed: Feb. 29, 2012

(65) Prior Publication Data

US 2013/0219853 A1  Aug. 29, 2013

(51) Int. Cl.
*F02C 3/14* (2006.01)
*F01D 9/02* (2006.01)
*F23R 3/42* (2006.01)

(52) U.S. Cl.
CPC . *F01D 9/023* (2013.01); *F02C 3/14* (2013.01); *F02C 3/145* (2013.01); *F23R 3/425* (2013.01)

(58) Field of Classification Search
CPC .............. F02C 7/18; F02C 7/185; F02C 6/06; F02C 6/08; F23R 3/425; F23R 3/44; F23R 3/46; F23R 3/48; F23R 3/60; F23R 3/602; F23R 3/04
USPC .......................... 60/39.37, 752, 722, 782, 785
See application file for complete search history.

(56) References Cited

U.S. PATENT DOCUMENTS 2,488,783 A * 11/1949 Stalker ............................ 416/34
2,540,526 A *  2/1951 Howell ......................... 60/39.37
2,557,747 A *  6/1951 Judson et al. ................. 415/112
3,418,808 A * 12/1968 Rich ............................. 60/226.1
3,552,873 A *  1/1971 Ghougasian .................... 415/49
4,455,121 A    6/1984 Jen
6,968,696 B2  11/2005 Little
7,086,233 B2   8/2006 Chehab et al.
7,096,673 B2   8/2006 Little et al.
7,107,773 B2   9/2006 Little
7,721,547 B2   5/2010 Bancalari et al.

(Continued)

FOREIGN PATENT DOCUMENTS

CN        1626877 A     6/2005
CN        1828140 A     9/2006

(Continued)

OTHER PUBLICATIONS

PCT International Preliminary Report on Patentability for Int. App. PCT/US2013026776.*

*Primary Examiner* — Phutthiwat Wongwian
*Assistant Examiner* — Marc Amar (57) ABSTRACT

A midframe portion (313) of a gas turbine engine (310) is presented and includes a compressor section with a last stage blade to orient an air flow (311) at a first angle (372). The midframe portion (313) further includes a turbine section with a first stage blade to receive the air flow (311) oriented at a second angle (374). The midframe portion (313) further includes a manifold (314) to directly couple the air flow (311) from the compressor section to a combustor head (318) upstream of the turbine section. The combustor head (318) introduces an offset angle in the air flow (311) from the first angle (372) to the second angle (374) to discharge the air flow (311) from the combustor head (318) at the second angle (374). While introducing the offset angle, the combustor head (318) at least maintains or augments the first angle (372).

15 Claims, 8 Drawing Sheets

(56) References Cited

U.S. PATENT DOCUMENTS

| | | |
|---|---|---|
| 2010/0180605 A1 | 7/2010 | Charron |
| 2011/0203282 A1 | 8/2011 | Charron et al. |
| 2011/0209482 A1 | 9/2011 | Toqan et al. |
| 2012/0031068 A1* | 2/2012 | Charron .................... 60/39.091 |
| 2013/0224009 A1* | 8/2013 | Little et al. ................. 415/208.1 |

FOREIGN PATENT DOCUMENTS

| | | | |
|---|---|---|---|
| CN | 101784842 A | | 7/2010 |
| GB | 1043920 A | * | 9/1966 |

* cited by examiner

MID-SECTION OF A CAN-ANNULAR GAS TURBINE ENGINE WITH AN IMPROVED ROTATION OF AIR FLOW FROM THE COMPRESSOR TO THE TURBINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to can-annular gas turbine engines, and more specifically, to a midframe portion of a can-annular gas turbine engine.

BACKGROUND OF THE INVENTION

Figure 1:
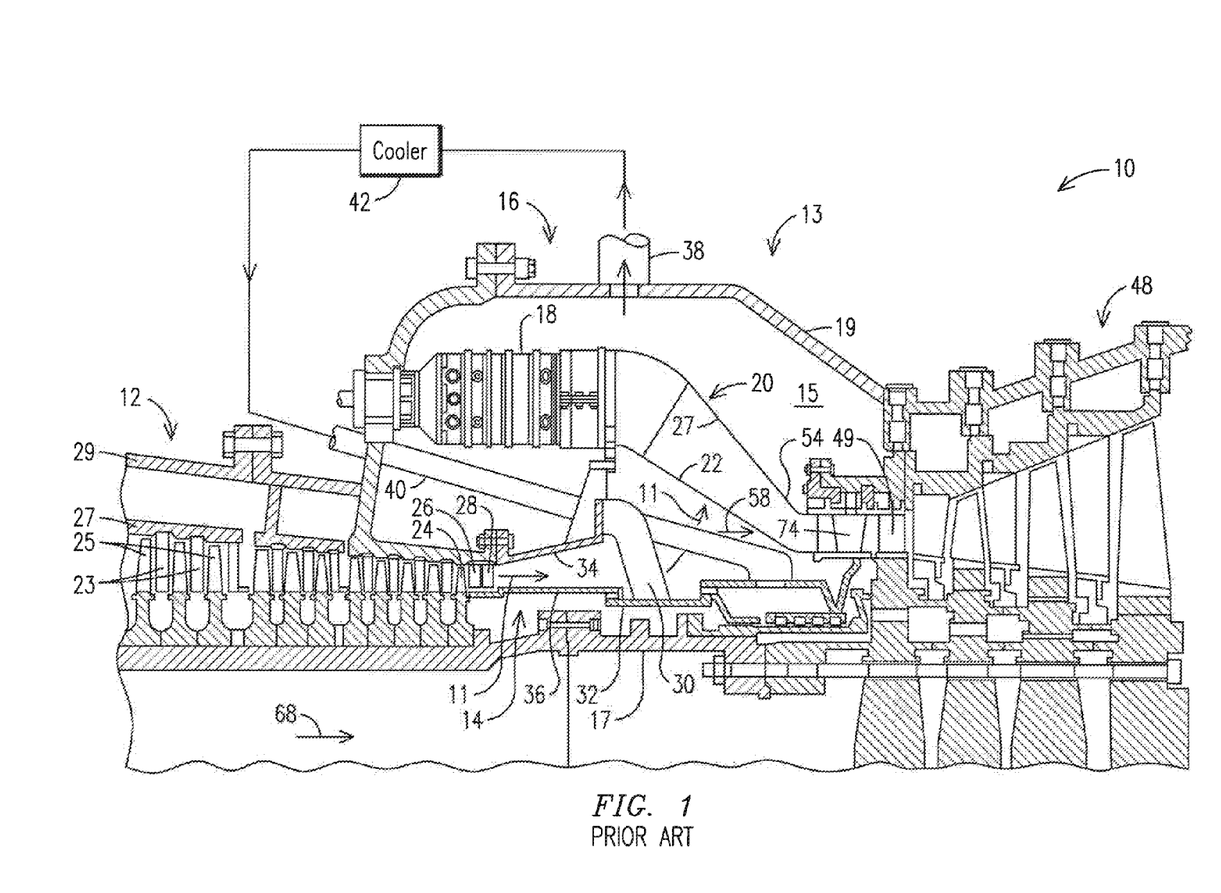
FIG. 1 is a cross-sectional view of a portion of a conventional turbine engine.

A conventional midframe design for a can-annular gas turbine engine is discussed in U.S. Pat. No. 7,721,547 ("'547 Patent"), assigned to the assignee of the present invention, which is incorporated by reference herein. FIG. 1 of the '547 Patent is reproduced as FIG. 1 herein, and illustrates a cross-section through a midframe portion 13 of a conventional can-annular gas turbine engine 10. The major components of the gas turbine engine 10 are a compressor section 12, a combustion section 16 and a turbine section 48. A rotor assembly 17 is centrally located and extends through the three sections. In operation, the compressor section 12 receives air through an intake (not shown) and compresses it. The compressed air flow 11 passes from the compressor section 12 to an axial diffuser 14, after which the air flow 11 enters a chamber 15 within a casing 19, where the total air flow 11 is separated and enters one of multiple combustor heads 18 of the can-annular combustion section 16 that encircle the rotor assembly 17 in an annular configuration.

As illustrated in FIG. 1, the compressor section 12 includes cylinders 27, 29 that enclose alternating rows of stationary vanes 23 and rotating blades 25. The stationary vanes 23 can be affixed to the cylinder 27 while the rotating blades 25 can be mounted to the rotor assembly 17 for rotation with the rotor assembly 17. The stationary vanes 23 include a last stationary vane 26 and an outlet guide vane 28 positioned adjacent to an outlet of the compressor section 12. Additionally, the rotating blades 25 include a last stage blade 24 positioned upstream from the last stationary vane 26 and the outlet guide vane 28. The last stationary vane 26 and outlet guide vane 28 are used to remove an absolute tangential swirl angle (measured in an absolute reference frame with respect to the longitudinal direction) of the air flow 11 coming off the last stage blade 24.

As further illustrated in FIG. 1, load-bearing struts 30 are provided to support a shaft cover 32 of the rotor assembly 17 at the casing 19 of the combustion section 16. As appreciated by one of skill in the art, one strut 30 may be provided per each one to four combustor heads 18. As illustrated in FIG. 1, the axial diffuser 14 includes an inner cone 36 and an outer cone 34 and the cross-sectional area between the inner and outer cones 36, 34 increases in the longitudinal direction 68, such that the air flow 11 expands and decelerates through the diffuser 14, thereby converting velocity head into pressure head. As illustrated in FIG. 1, the strut 30 is attached between a shaft cover 32 to the outer cone 34 of the axial diffuser 14, and thus the casing 19 of the combustion section 16 supports the strut 30 at the shaft cover 32.

As further illustrated in FIG. 1, a rotor-cooling extraction pipe 38 is provided, which extracts compressed air from the chamber 15 and passes the compressed air into a cooler 42. The cooled air passes from the cooler 42 and through rotor-cooling injection pipes 40 that are positioned within the chamber 15 and direct the cooled air below the shaft cover 32, to cool the rotating components of the engine.

Another portion of the engine needing cooling is a turn in the transition 20 at an inlet to the turbine section 48, which typically experiences an especially high heat flux during an operation of the gas turbine engine 10. In order to cool a rear end 54 of the transition 20 during operation of the gas turbine 10, a portion 58 of the air flow 11 entering the chamber 15 makes contact with the rear end 54 of the transition 20 proximate the highest heat flux region in order to cool the rear end 54 of the transition 20 using thermal convection.

Figure 2:
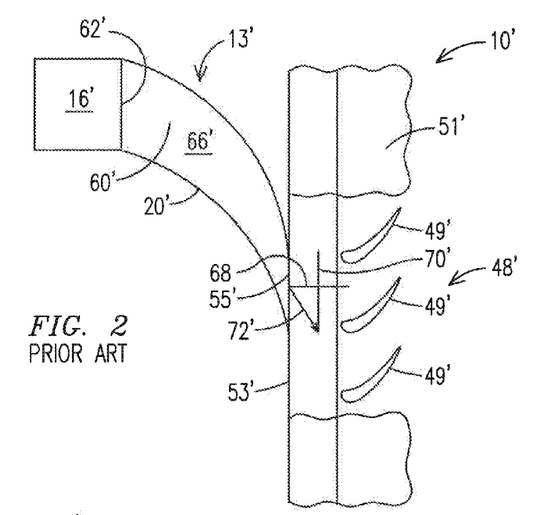
FIG. 2 is a cross-sectional view of a trans-vane design of a transition of a conventional turbine engine.
Figure 3:
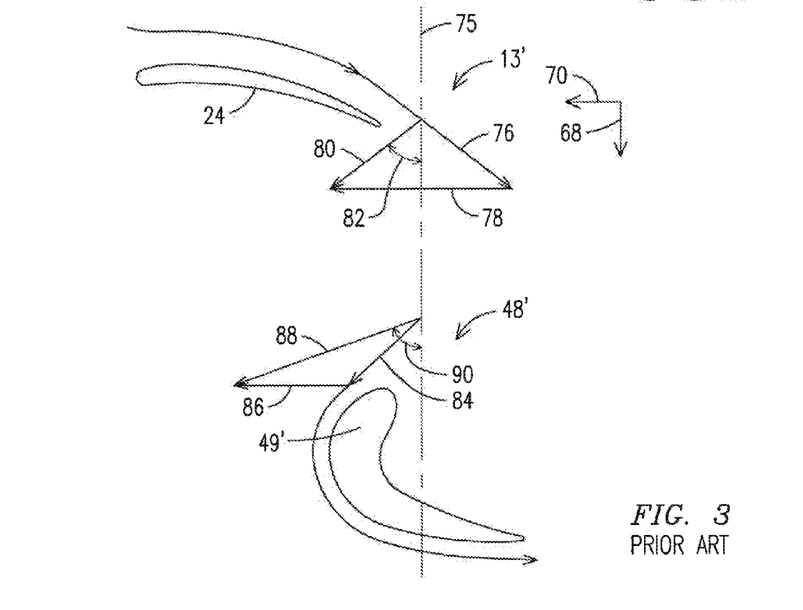
FIG. 3 is a radial view of a last compressor blade and a first turbine blade of the conventional turbine engine of FIG. 2.

FIG. 8 of the '547 Patent is reproduced herein as FIG. 2, and illustrates a "trans-vane" transition 20' which improves upon the transition 20 of FIG. 1. FIG. 2 illustrates a top down radial view of the midframe portion 13' of the gas turbine engine 10' including the combustion section 16' and a first stage turbine blade array 49' of the turbine section 48' located downstream from the combustion section 16', with the trans-vane transition 20' located therebetween. The midframe portion 13' of FIG. 2 includes a compressor section (not shown) similar to the compressor section 12 of FIG. 1. A first stage housing encloses the first stage turbine blade array 49' and includes a blade ring 51'. An upstream side 53' of the blade ring 51' is preferably adapted to couple to a transition outlet 55'. The trans-vane transition 20' includes a transition duct body 60' with an inlet 62' to receive a gas flow exhausted from the combustor section 16' and the outlet 55' to discharge a gas flow toward the first stage blade array 49' with an internal passage 66' therebetween. The outlet 55' is offset from the inlet 62' in the three coordinate directions—in the radial direction (in/out of the figure), the longitudinal direction 68 and the tangential direction 70'. The gas flow discharged from the outlet 55' is angled in the tangential direction 70' within an absolute reference frame, relative to the longitudinal direction 68 as depicted by the arrow 72', as required by the first stage turbine blade array 49'. A brief discussion will be provided of the absolute and relative reference frames of the midframe portion 13', as well as how the velocity vector of an air flow exiting the compressor and entering the turbine 48' of the gas turbine engine 10' is represented in each of those reference frames. As discussed below, the velocity vector of an air flow exiting the compressor or entering the turbine is measured in an absolute reference frame, with respect to a longitudinal direction 68 along the longitudinal axis 75 of the gas turbine engine. FIG. 3 illustrates a top down radial view of the last stage blade 24 of the compressor section 12 of the gas turbine engine 10' and the first stage blade 49' of the turbine 48' of the midframe portion 13', separated along a longitudinal axis 75 of the conventional gas turbine engine 10' of FIG. 2 oriented along the longitudinal direction 68. An outgoing air flow off the last stage blade 24 is oriented in the (relative) reference frame of the last stage blade 24 along a relative outgoing velocity vector 76. During an operation of the compressor section 12, the last stage blade 24 rotates around the longitudinal axis 75 with a blade velocity vector 78 that is oriented perpendicular to the longitudinal axis 75. In order to determine the velocity vector of the outgoing air flow off the last stage blade 24 in an absolute reference frame, the blade velocity vector 78 is added to the relative outgoing velocity vector 76, resulting in an absolute outgoing velocity vector 80 that is angled in the tangential direction 70 by an angle 82, relative to the longitudinal axis 75 oriented in the longitudinal direction 68. In an exemplary embodiment, the angle 82 is approximately 45 degrees. Accordingly, the absolute outgoing velocity vector 80 of the outgoing air flow off the last stage blade 24 is oriented approximately 45 degrees in the tangential direction 70, relative to the longitudinal axis 75 oriented in the longitudinal direction 68. The last stage vanes 26,28 of the conventional midframe portion 13' are configured to reduce the angle 82 of the absolute outgoing velocity vector 80 from 45 degrees to approximately 0 degrees, to align the air flow along the longitudinal axis 75. However, as discussed below, the embodiments of the present invention do not utilize the last stage vanes, and thus utilize the initial angle 82 of the absolute outgoing velocity vector 80 off the last stage blade 24. FIG. 3 also illustrates an incoming air flow to the first stage blade 49' of the turbine 48' illustrated in FIG. 2. In order to maximize the effectiveness of the turbine 48', the incoming air flow is oriented in the (relative) reference frame of the first stage blade 49' along a relative incoming velocity vector 84. During an operation of the turbine 48', the first stage blade 49' rotates around the longitudinal axis 75 with a blade velocity 86 that is oriented perpendicular to the longitudinal axis 75. In order to determine the velocity vector of the incoming air flow in the absolute reference frame, the blade velocity vector 86 is added to the relative incoming velocity vector 84, resulting in an absolute incoming velocity vector 88 that is angled in the tangential direction 70 by an angle 90, relative to the longitudinal direction 68. In an exemplary embodiment, the angle 90 is approximately 70 degrees. Accordingly, the absolute incoming velocity vector 88 of the incoming air flow onto the first stage blade 49' of the turbine 48' is oriented approximately 70 degrees in the tangential direction 70, relative to the longitudinal direction 68. In contrast with the transition 20' of FIG. 2, the transition 20 illustrated in FIG. 1 discharges a gas flow to the turbine section 48 with an offset in only the radial direction and the longitudinal direction 68, and thus the gas flow is not angled in the tangential direction relative to the longitudinal direction 68. Since the first stage turbine blade array 49 of the turbine section 48 requires an incoming gas flow that is angled in the tangential direction relative to the longitudinal direction 68, the turbine section 48 of FIG. 1 includes a first stage vane 74, to introduce an offset in the tangential direction for the gas flow discharged from the transition 20. However, by implementing the trans-vane design in the transition 20', the gas flow is discharged from the outlet 55' at the necessary angle 90 in the tangential direction 70 relative to the longitudinal direction 68 to accommodate the first stage turbine blade array 49', and thus the first stage vanes 74 are not needed. In the '547 Patent, the inventors made various improvements to the midframe portion of the gas turbine engine, downstream of the combustion section, to enhance the operating efficiency of the gas turbine engine. In the present invention, the present inventors make various improvements to the midframe portion of the gas turbine engine, upstream of the combustion section, to also enhance the operating efficiency and/or cost efficiency of the gas turbine engine.

SUMMARY OF THE INVENTION

The present inventors have recognized that significant improvements in the operating efficiency of a can annular gas turbine engine may be obtained by innovation in the design of the mid-section of the engine. The inventors have recognized that the movement of air from the compressor section to the combustor section in a can-annular gas turbine engine is a generally unstructured, chaotic process. Compressed air produced by the compressor section is directed into the annular chamber 15 and is allowed to find its path of least resistance around various structural obstacles and into one of the respective combustor heads 18. As a result, the flow experiences turbulence and fluid friction induced pressure losses. The present inventors have recognized that an improved engine mid-section design can minimize such losses, by minimizing swirl reduction, thereby providing improved overall engine performance.

The air flow 11 experiences aerodynamic loss based on a total angle of rotation while traveling from the compressor section 12 to one of the combustor heads 18. The last stationary vane 26 and outlet guide vane 28 collectively rotate the air flow 11 by an initial absolute tangential swirl angle to remove the initial absolute tangential swirl angle that is imparted by the rotating blades 24, such as 45 degrees, to align the air flow 11 in a downstream longitudinal direction 68 upon entering the axial diffuser 14. In addition to the initial absolute tangential swirl angle rotation, upon exiting the diffuser 14 and entering the chamber 15, the air flow 11 experiences two 180 degree rotations: a first approximate 180 degree rotation to orient the air flow 11 from an initial downstream longitudinal direction 68 to an upstream longitudinal direction to travel longitudinally backward to a respective combustor head 18, and a second approximate 180 degree rotation at the combustor head 18 to direct the air flow 11 into an inlet of the combustor head 18. Accordingly, the air flow 11 undergoes a total rotation of approximately 400 degrees while traveling from the compressor section 12 to one of the combustor heads 18, and most of this rotation is accomplished in the unstructured environment of the chamber 15. The present inventors have recognized that the aerodynamic efficiency of the air flow from the compressor section to the respective combustor head can be enhanced by reducing this total rotation of the air and/or controlling the rotation process more precisely. For example, a radial velocity component may be introduced to the air flow at the diffuser outlet, such that the air flow is a mixed-flow (which has combined longitudinal, tangential and radial velocity components) at the diffuser outlet. By introducing the radial velocity component to the air flow at the diffuser outlet, the required total angle of rotation within the chamber 15 will be decreased, and the aerodynamic efficiency of the air flow from the compressor section to the respective combustor head would be enhanced. As discussed above, the last stage vane and outlet guide vane of a conventional can-annular gas turbine engine 10 are provided to eliminate the initial tangential swirl angle of approximately 45 degrees that is imparted by the rotating compressor blades 24, so that the air flow is directed into the chamber 15 along a downstream longitudinal direction (0 degree tangential swirl angle). The present inventors have recognized that some transition designs, such as the trans-vane design discussed above in FIG. 2, require a final absolute tangential swirl angle (with respect to the longitudinal direction 68) to be output from the transition 20' to the first stage blade 49' of the turbine section 48' which is greater than the initial absolute tangential swirl angle generated by the last stage blade of the compressor section. For example, in an exemplary embodiment, a trans-vane design requires a final absolute tangential swirl angle of 70 degrees to the first stage blade 49' of the turbine section 48', in excess of the initial absolute tangential swirl angel of 45 degrees off the last stage blade 24 of the compressor section. The present inventors have recognized that it would be advantageous to maintain and then augment the initial absolute tangential swirl angle off the last stage blade of the compressor section rather than the conventional practice of eliminating it through the last stage compressor vane 26 and outlet guide vane 28 and replacing it through the transition 20' to the first stage blade 49' of the turbine section 48'. The inventors have recognized that the initial absolute tangential swirl angle off the last stage blade of the compressor section can be increased by an offset angle through a trans-vane transition so that the absolute tangential swirl angle of the air flow output from the trans-vane transition fulfills the required final absolute tangential swirl angle incident on the first stage blade 49'. This offset angle through the transition may be 25 degrees, for example, which is additive to the 45 degree angle provided by the last stage compressor blades 24 to achieve a required 70 degree tangential angle at the first stage turbine blade 49', thereby eliminating the need for the last stage compressor vane 26 and outlet guide vane 28. By maintaining or supplementing the initial absolute tangential swirl angle of the air flow off the last stage blade of the compressor section, the air flow can be passed from the compressor outlet to a respective combustor head with a substantially reduced total angle of rotation when compared to the conventional design, thereby enhancing the aerodynamic efficiency of the midframe portion of the gas turbine engine.

The present inventors have also recognized that the aerodynamic efficiency of the air flow 11 from the compressor section 12 to the combustor heads 18 may be enhanced by directly coupling the air flow from respective sections of the compressor-diffuser outlet to each individual combustor head inlet. In the conventional gas turbine, the compressed air flow 11 passes from the compressor section 12 to the axial diffuser 14, after which the air flow 11 enters the chamber 15 within the casing 19, where the air flow 11 experiences aerodynamic loss in the process of randomly entering any of the multiple combustor heads 18 within the chamber 15. Upon exiting the diffuser 14 and entering the chamber 15, the air flow 11 also experiences aerodynamic losses as a result of making contact with the load-bearing struts 30, the rotor-cooling injection pipes 40 and a near side 22 of the transition 20, which are each positioned adjacent to the outlet of the diffuser 14. By directly coupling the air flow 11 from the compressor-diffuser outlet to a respective combustor head inlet as described herein, the air flow avoids entering the chamber altogether, thereby allowing for the reduction of the aerodynamic losses associated with randomly entering one of the multiple combustor heads 18.

BRIEF DESCRIPTION OF THE DRAWINGS

The invention is explained in the following description in view of the drawings that show.

DETAILED DESCRIPTION OF THE INVENTION

As discussed above, the inventors of the present invention recognized that an improved midframe portion of the gas turbine engine features initiating a mixed air flow (axial, tangential plus radial flow velocities) from the diffuser outlet. By initiating the mixed-air flow from the diffuser outlet, the air flow passes from the diffuser outlet to the combustor head inlet while undergoing a reduced total angle of rotation when compared to the air flow with the conventional midframe portion.

Figure 4:
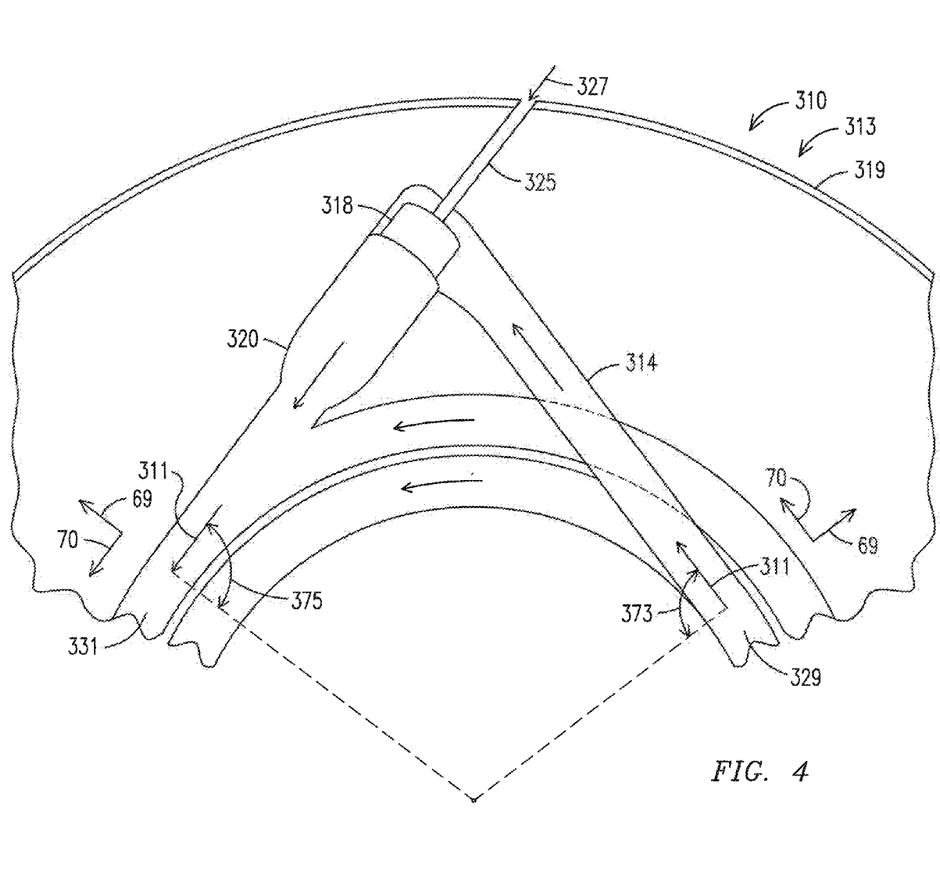
FIG. 4 is a partial longitudinal view of a linear diffuser duct within a turbine engine.
Figure 11:
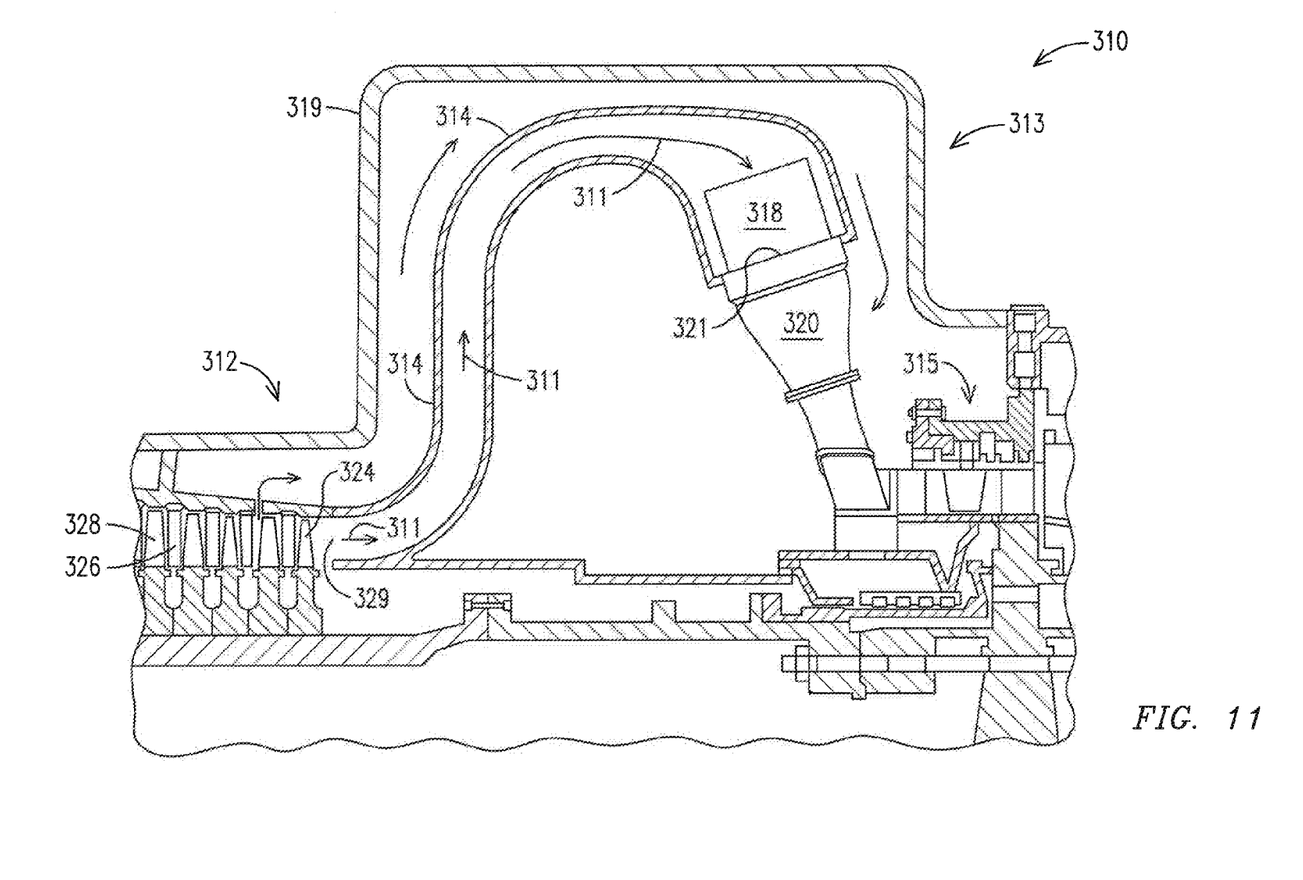
FIG. 11 is a cross-sectional view of a linear diffuser duct within a turbine engine.

A midframe design is provided, in which a mixed air flow can be initiated within a diffuser of the midframe portion, downstream of the traditional axial compressor section. FIGS. 4 and 11 illustrate cross-sectional views of a midframe portion 313 of a gas turbine engine 310, in which a compressor section 312 compresses an air flow with alternating rows of stationary blades 326 and rotating blades 328, and discharges the air flow from a last stage blade 324 into an annulus 329 downstream of the compressor section 312. A plurality of manifolds or diffuser ducts 314 are positioned in an annular configuration around the rotor assembly (not shown) of the gas turbine engine 310. The diffuser duct 314 receives compressed air from the annulus 329 and the diffuser duct 314 is directed tangentially in a tangential direction 70 at an angle 373 which is oriented 90 degrees from the radial direction 69. Accordingly, an air flow 311 from the annulus 329 is respectively directed in a mixed flow direction into each respective diffuser duct 314, with both a radial and tangential velocity components based on the angle 373 and a longitudinal velocity component along the longitudinal direction. The diffuser duct 314 is discussed in greater detail below, and includes features which minimize the required total angle of rotation of the mixed air flow 311 as it passes from the compressor section 312 outlet to the combustor 318, to the transition 320 and eventually to the annulus 331 and the turbine section 315 of the gas turbine engine 310. The above discussion of the diffuser duct 314 establishes that a mixed-air flow 311 can be established within the diffuser duct 314 of the midframe portion 313 of the gas turbine engine 310.

Figure 5:
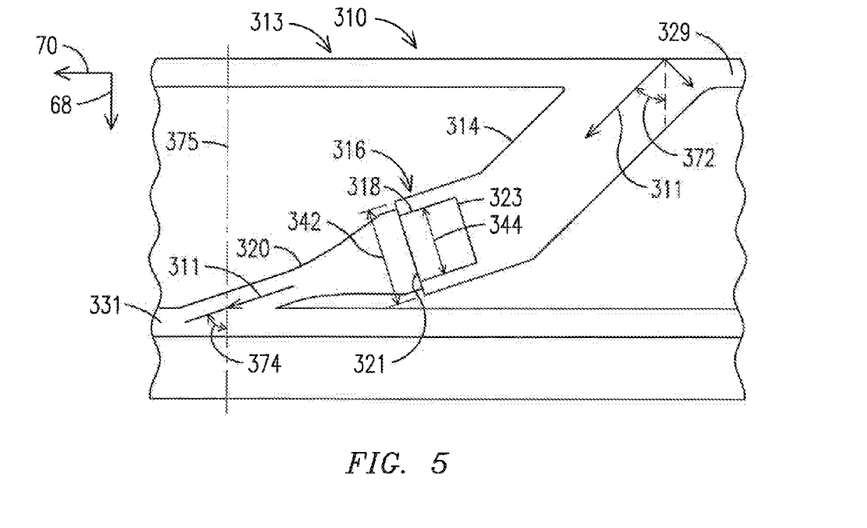
FIG. 5 is a partial radial view of the linear diffuser duct illustrated in FIG. 4.

FIG. 5 illustrates a radial view of the diffuser duct 314 of FIG. 4, in the longitudinal-tangential plane, where the diffuser duct 314 extends from the annulus 329 at the compressor section outlet, to the respective combustor head 318 inlet of the combustor 316. The last stage blade (not shown) of the compressor section in the midframe portion 313 of FIG. 5 is similar to the last stage blade 24 of the midframe portion 13' illustrated in FIG. 3, and thus the air flow 311 comes off the last stage blade (not shown) of the midframe portion 313 with an absolute outgoing velocity vector oriented at an angle 372 in the tangential direction 70 with respect to the longitudinal direction 68. In an exemplary embodiment, the angle 372 is approximately 45 degrees. To accommodate the absolute outgoing velocity vector oriented at the angle 372, the diffuser duct 314 is a straight duct that is also angled at the angle 372, to receive the air flow 311. Also, the first stage blade (not shown) of the turbine in the midframe portion 313 of FIG. 5 is similar to the first stage blade 49' of the midframe portion 13' illustrated in FIG. 3, and thus the air flow 311 is incident on the first stage blade 49' with an absolute incoming velocity vector oriented at an angle 374 in the tangential direction 70 with respect to the longitudinal direction 68. In an exemplary embodiment, the angle 374 is approximately 70 degrees. To accommodate the absolute incoming velocity vector oriented at the angle 374, a trans-vane transition 320 is a straight duct that is also angled at the angle 374, to receive the air flow 311 from the combustor head 318 at the angle 374. Thus, the air flow 311 experiences an offset in the absolute velocity vector from the angle 372 to the angle 374 at the combustor head 318. Although the angular offset from the angle 372 to the angle 374 occurs at the combustor head 318, the angular offset is relatively small, such as 25 degrees, for example, in comparison with the total angle of rotation of the air flow from the compressor outlet to the combustor head inlet in a conventional midframe portion, such as 400 degrees, for example. As illustrated in FIG. 5, the diffuser duct 314 is designed to accommodate an air flow from an annulus 329 through a straight tubular duct and to an outlet, while the transition 320 is designed with a reverse design to the diffuser duct 314, as it accommodates an air flow from an inlet through a straight tubular duct and to an annulus 331 within the turbine section. As illustrated in FIG. 4, an injector 325 is positioned to pass a volume of fuel 327 into the combustor head 318, which is mixed with the air flow 311 and the air-fuel mixture is subsequently ignited. As illustrated in FIG. 5, an outlet of the diffuser duct 314 encloses the inlet of the combustor head 318 inlet, since the outer diameter 342 of the diffuser duct 314 outlet is greater than the outer diameter 344 of the combustor head 318 inlet.

In addition to the angular offset of the air flow 311 traveling within the longitudinal-tangential plane (FIG. 5) of the midframe portion 313, the air flow 311 experiences an angular offset in the radial-tangential plane of the midframe portion 313, and both of these angular offsets are combined to determine the total angle of rotation of the air flow 311 while passing from the compressor outlet to the respective combustor head 318 inlet. FIG. 4 illustrates the midframe portion 313, within the radial-tangential plane, in which the air flow 311 passes from the annulus 329 at the compressor outlet (not shown) in the tangential direction 70 oriented at an angle 373 which is 90 degrees with respect to the radial direction 69. The air flow 311 passes within the diffuser duct 314, that is similarly angled in the radial-tangential plane at the angle 373, and enters the combustor head 318 inlet in a mixed-flow direction with combined radial and tangential velocity components. The air flow 311 emerges from the combustor head 318 inlet in a mixed-flow direction with combined radial and tangential velocity components at an angle 375 and passes within the transition 320, that is similarly angled in the radial-tangential plane at the angle 375. The air flow 311 subsequently exits the transition 320 at an annulus 331 in a tangential direction 70 that is oriented at the angle 375 which is 90 degrees with respect to the radial direction 69 at the transition 320 exit. Upon entering the annulus 331, the air flow 311 is directed at the first stage blades of the turbine (not shown), at the appropriate angle 374 in the longitudinal-tangential plane (FIG. 5). The angular offset of the air flow 311 in the radial-tangential plane is based on such factors as the radial height of the compressor section outlet, the radial height of the combustor head 318 and the radial height of the turbine inlet. For purposes of FIG. 4, it is presumed that the height of the last stage blade of the compressor section is less than the height of the first stage blade of the turbine within the casing 319, and thus the air flow 311 enters the diffuser duct 314 at a reduced radial height than the air flow 311 exits the transition 320. In an exemplary embodiment, the angle 373 may be 90 degrees, while the angle 375 may be 90 degrees, and thus the air flow 311 would undergo an approximate 90 degree rotation in the radial-tangential plane, while traveling from the compressor section outlet and into the combustor head 318 inlet.

As previously discussed, the integrated diffuser duct 314 provides a substantial reduction in the total angle of rotation of the air flow 311, as the air flow 311 passes from the compressor section outlet to the combustor head 318 inlet. The total angle of rotation of the air flow 311 includes the angle of rotation of the air flow 311 within the longitudinal-tangential plane (FIG. 5) and the angle of rotation of the air flow 311 within the radial-tangential plane (FIG. 4). As discussed above, in an exemplary embodiment, the angle of rotation of the air flow 311 within the longitudinal-tangential plane (FIG. 5) may be approximately 25 degrees, for example. Also, as discussed above, in an exemplary embodiment, the angle of rotation of the air flow 311 within the radial-tangential plane (FIG. 4) may be approximately 90 degrees, for example. Thus, as a result of using the integrated diffuser duct 314, the total angle of rotation for the air flow 311 passing from the compressor outlet to the combustor head 318 inlet is approximately 115 degrees. This total angle of rotation is substantially less than the approximate 400 degree total angle of rotation of the air flow passing from the compressor outlet to the combustor head inlet in a conventional midframe portion of the gas turbine engine. Indeed, the diffuser duct 314 enhances the aerodynamic efficiency of the midframe portion 313 of the gas turbine engine 310.

Figure 6:
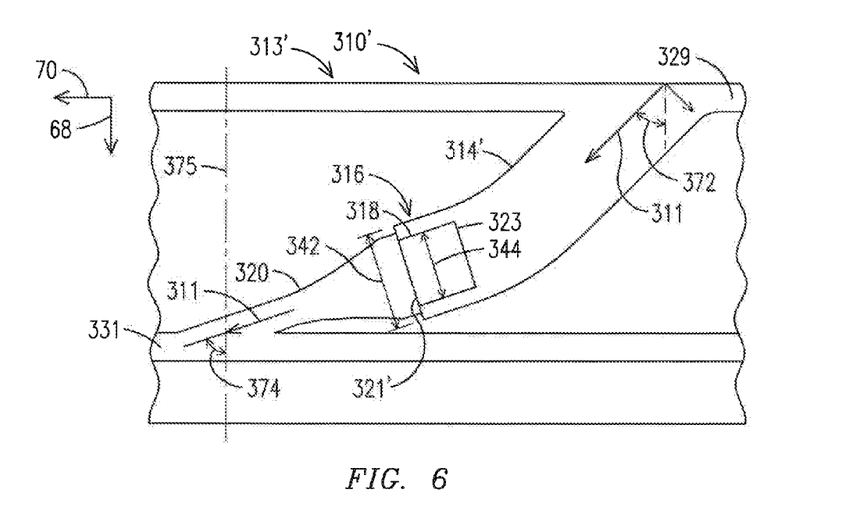
FIG. 6 is a partial radial view of a helical diffuser duct within a turbine engine.
Figure 7:
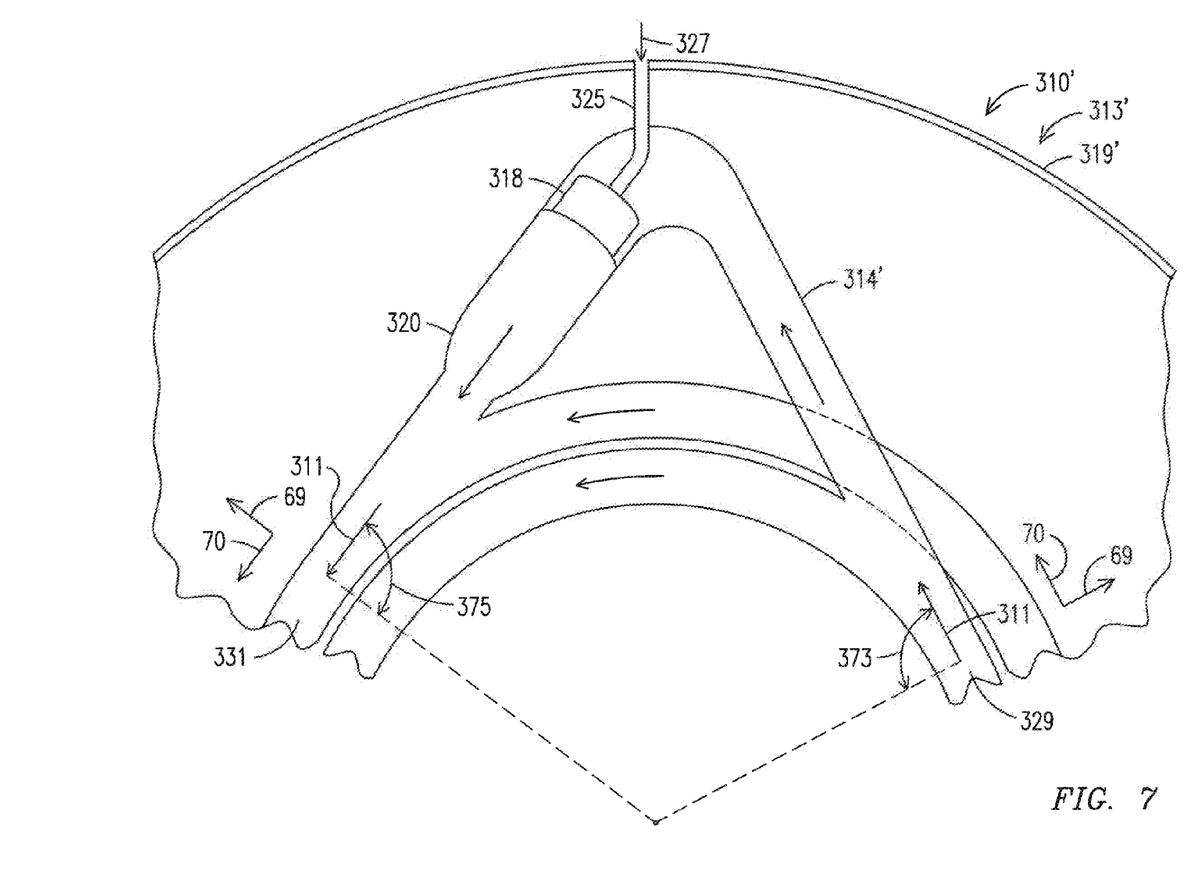
FIG. 7 is a partial longitudinal view of the helical diffuser duct illustrated in FIG. 6.

FIGS. 6-7 illustrate an alternate embodiment of the midframe portion 313' of the gas turbine engine 310', which is similar to the midframe portion 313 of FIGS. 4 and 5, with the exception that the diffuser duct 314' has an alternate design than the diffuser duct 314 of FIGS. 4 and 5. As previously discussed, the diffuser duct 314 of FIGS. 4 and 5 features a straight tubular configuration, which directs the air flow 311 to the combustor head 318 inlet at the angle 372 in the tangential direction 70 relative to the longitudinal direction 68, after which the air flow 311 undergoes an angular offset at the combustor head 318 inlet to the angle 374 in the tangential direction 70 relative to the longitudinal direction 68, before passing through to the transition 320. Thus, the angular offset of the air flow 311 from the angle 372 to the angle 374 occurs at the combustor head 318 inlet. In contrast with the diffuser duct 314 of FIGS. 4 and 5, the diffuser duct 314' of FIGS. 6-7 takes a helical shape rather than a straight tubular configuration, where the inlet of the diffuser duct 314' at the annulus 329 is aligned at the angle 372 in the tangential direction 70 relative to the longitudinal direction 68, while the outlet of the diffuser duct 314' at the combustor head 318 inlet is aligned at the angle 374 in the tangential direction 70 relative to the longitudinal direction 68. Thus, the angular offset of the air flow 311 from the angle 372 to the angle 374 occurs over the length of the helical shape of the diffuser duct 314' between the inlet at the annulus 329 and the outlet at the combustor head 318 inlet. Since the required angular offset from the angle 372 to the angle 374 occurs over the length of the diffuser duct 314', the angular offset need not occur at the combustor head 318 inlet. Accordingly, the air flow 311 passing from the outlet of the diffuser duct 314' into the combustor head 318 inlet experiences minimal angular offset. The outlet of the diffuser duct 314' in FIGS. 6-7 is attached to the combustor head 318 inlet such that the face 321' of the diffuser duct 314' outlet is aligned parallel with the face 323 of the combustor head 318 inlet. As with the midframe portion 313 illustrated in FIGS. 4 and 5, the outer diameter 342 of the diffuser duct 314' outlet is greater than the outer diameter 344 of the combustor head 318 inlet, such that the diffuser duct 314' outlet encloses the combustor head 318 inlet. As illustrated in FIG. 7, since the diffuser duct 314' takes a helical shape in the radial-tangential plane, the diffuser duct 314' may rise to a peak radial height that is greater than a peak radial height of the diffuser duct 314 with the straight tubular configuration illustrated in FIG. 4. Thus, in order to accommodate the greater peak radial height of the diffuser duct 314', the midframe portion 313' may feature a larger casing 319' than the casing 319 of FIG. 4, such that the diffuser duct 314' has adequate radial space within the casing 319' to pass the mixed-air flow 311 from the compressor outlet to the combustor head 318 inlet. Based on the larger casing 319' of the midframe portion 313' and the smaller casing 319 of the midframe portion 313, the manufacturing cost efficiency for the midframe portion 313 may be greater than the midframe portion 313'. However, as previously discussed, the diffuser duct 314 takes on a straight tubular form which directs the angular offset from the angle 372 to the angle 374 at the outlet of the diffuser duct 314, while the diffuser duct 314' takes on a helical form which directs the angular offset from the angle 372 to the angle 374 along the length of the diffuser duct 314', and thus the aerodynamic efficiency of the midframe portion 313' may be greater than the midframe portion 313.

Figure 8:
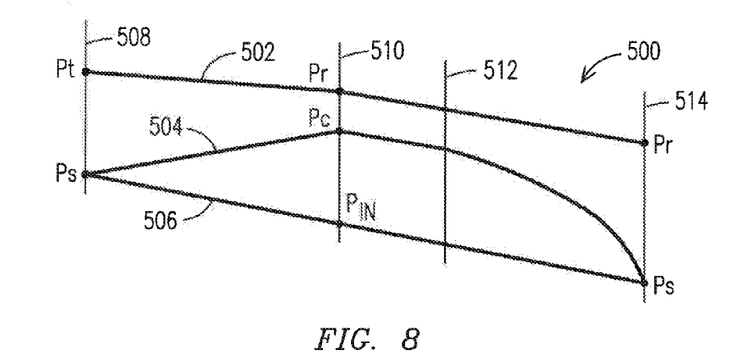
FIG. 8 is a plot of total pressure and static pressure of an air flow versus a longitudinal location of the air flow along a gas turbine engine.

The integrated diffuser duct embodiments of FIGS. 4-7 are used to reduce a dynamic pressure of the air flow and simultaneously increase a static pressure of the air flow, as the air flow passes through the diffuser duct. FIG. 8 illustrates a graph of the total pressure 502 and the static pressure 504 of the air flow 311 within the diffuser duct of FIGS. 4 and 5, as well as an intermediate pressure 506 outside the diffuser duct in the casing 319. As appreciated by one of skill in the art, the total pressure 502 of an air flow is the sum of the static pressure 504 of the air flow and a dynamic pressure of the air flow. Thus, the dynamic pressure of the air flow 311 can be determined by the difference between the total pressure 502 and the static pressure 504 of the air flow 311. FIG. 8 depicts the various pressures at different locations throughout the midframe portion 313 of the gas turbine engine 310, including the last stage blade of the compressor 508, the combustor head inlet 510, the combustor head outlet 512, and the transvane transition outlet 514. As illustrated in FIG. 8, as the air flow 311 passes through the diffuser duct 314 between the compressor last stage blade 508 and the combustor head inlet 510, the air flow 311 decelerates, thereby reducing the dynamic pressure, and thus increasing the static pressure 504. The diffuser duct 314 gradually reduces the dynamic pressure of the air flow 311, and thus effectively converts most or all of the dynamic pressure of the air flow 311 into static pressure 504. In contrast, the conventional midframe portion 13 of FIG. 1 discharges the air flow 11 into the chamber 15, where the air flow 11 suddenly loses a large amount of dynamic pressure which may not be converted back to dynamic pressure and thus is lost in the process of discharging the air flow 11 into the chamber 15. Upon entering the combustor head inlet 510, the fuel-air mixture in the combustor head 318 is ignited, which accelerates the air flow 311 through the combustor outlet 512 and through the outlet of the transition 514, thereby increasing the dynamic pressure, and thus decreasing the static pressure 504. Throughout the operation of the midframe portion 313, a pressure within the casing 319 is set at the intermediate pressure 506, which is less than the static pressure 504 at each location throughout the midframe portion 313. As appreciated by one of skill in the art, stagnant air may collect at the interfaces between the diffuser duct 314 and the combustor head 318, and the combustor head 318 and the transition 320. By adjusting the intermediate pressure 506 within the casing 319 to be less than the static pressure 504 of the air flow 311 within the diffuser duct 314, the combustor head 318 or the transition 320, a leakage of air flow will pass across these interfaces, to discharge any stagnant air within the interfaces, and thus prevent hot, stagnant air from building up at these interfaces.

Figure 9:
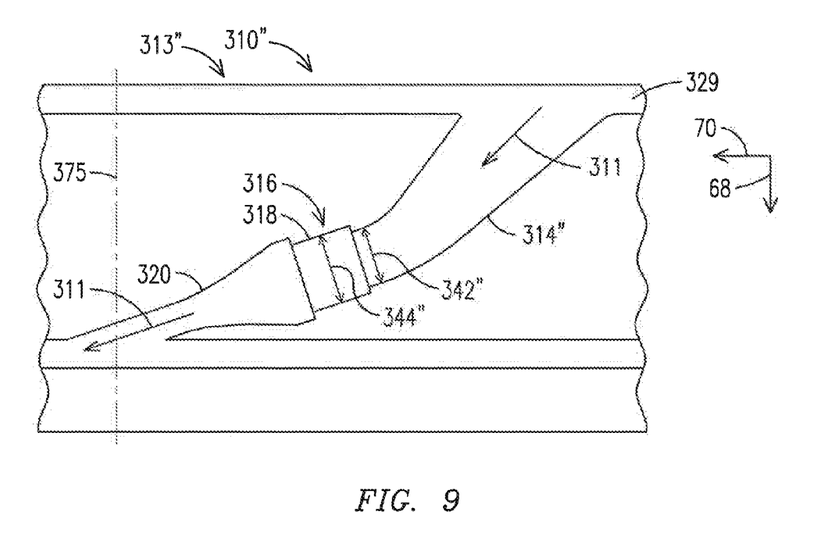
FIG. 9 is a partial radial view of a helical duct within a turbine engine.
Figure 10:
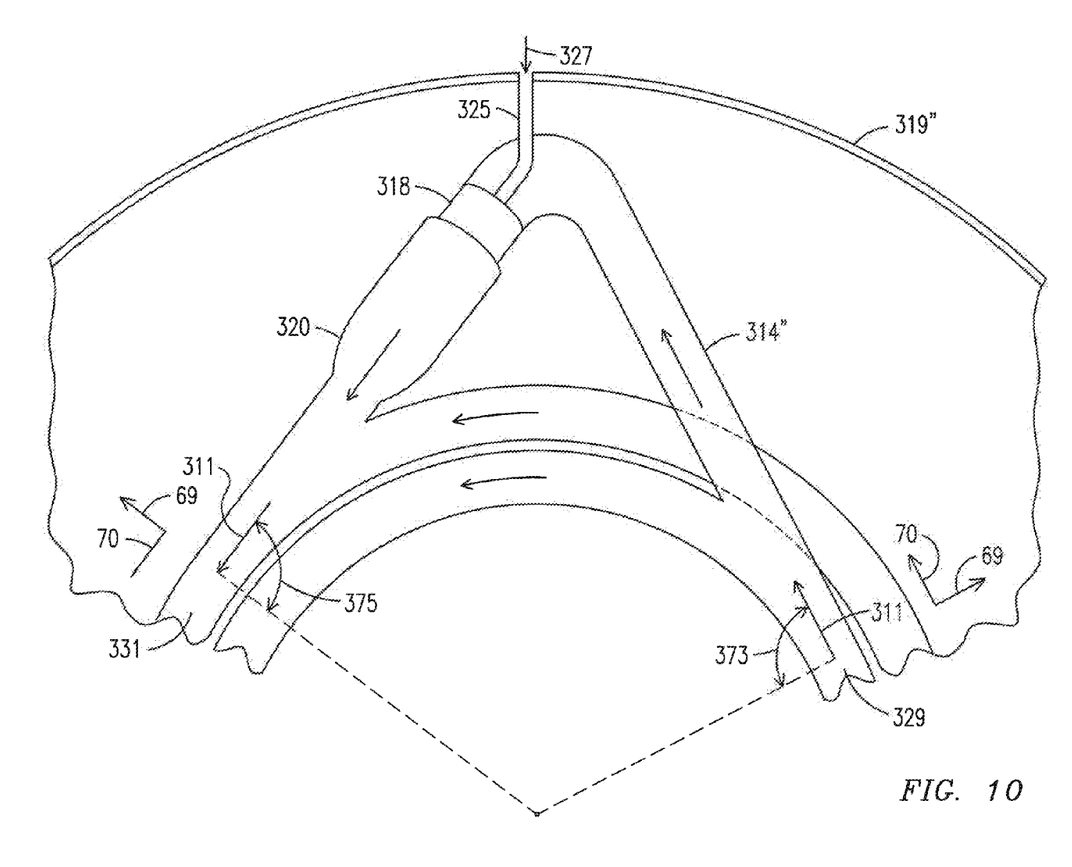
FIG. 10 is a partial longitudinal view of the helical duct illustrated in FIG. 9.

FIGS. 9-10 illustrate an alternate embodiment of the midframe portion 313" of the gas turbine engine 310", which is similar to the midframe portion 313' of the gas turbine engine 310' depicted in FIGS. 6-7, with the mixed-air flow 311 being passed through a manifold 314", which does not act as a diffuser, but instead accelerates a velocity of the mixed-air flow 311 from the annulus 329 at the compressor outlet to the combustor head 318 inlet. Unlike the diffuser duct 314' of FIGS. 6-7, the outer diameter 342" of the manifold 314" is less than the outer diameter 344" of the combustor head 318 inlet, such that the manifold 314" outlet is positioned within the inlet of the combustor head 318. In contrast, in the above embodiments of FIGS. 4-7, the outer diameter 342 of the diffuser duct is greater than the outer diameter 344 of the combustor head 318 inlet, so that the diffuser duct outlet encloses the combustor head 318 inlet. As with the midframe portions 313, 313' of FIGS. 4 and 7, the midframe portion 313" of FIG. 9 includes an injector 325 to pass a volume of fuel 327 into the combustor head 318. The fuel 327 may be a reactive fuel, such as hydrogen, for example, which exhibits high flame speeds, and thus requires a high incoming velocity of the mixed-air flow 311 into the combustor head 318, to avoid flashback. By sizing the outer diameter 342" of the manifold 314" to be less than the outer diameter 344" of the combustor head 318 inlet, and positioning the manifold 314" outlet within the combustor head 318 inlet, the velocity of the mixed-air flow 311 into the combustor head 318 inlet is increased, to the high incoming velocity threshold of the combustor head 318, to avoid flashback when reactive fuel 327 is passed into the combustor head 318 through the injector 325.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A midframe portion of a gas turbine engine, said midframe portion comprising:
   a compressor section with a last stage blade configured to orient an air flow discharged from the compressor section at a first angle;
   a turbine section with a first stage blade configured to receive the air flow oriented at a second angle;
   a manifold configured to directly couple the air flow from the compressor section to a combustor head of the gas turbine engine upstream of the turbine section;
   wherein the combustor head is within the manifold and configured to introduce an offset angle in the air flow from the first angle to the second angle such that the air flow discharged from the combustor head is oriented at the second angle;
   and wherein the combustor head is configured to at least maintain or augment the first angle of the air flow.

2. The midframe portion of claim 1, wherein the first angle is an initial tangential angle measured in an absolute reference frame with respect to a longitudinal axis of the gas turbine engine and wherein the second angle is a final tangential angle measured in the absolute reference frame with respect to the longitudinal axis.

3. The midframe portion of claim 2, wherein the combustor head is configured to introduce the angular offset of the air flow by at least maintaining the initial tangential angle of the air flow with respect to the longitudinal axis.

4. The midframe portion of claim 3, wherein the combustor head is configured to augment the initial tangential angle measured with respect to the longitudinal axis with the offset angle equal to the difference between the final tangential angle and the initial tangential angle to orient the air flow at the final tangential angle measured with respect to the longitudinal axis.

5. The midframe portion of claim 2, wherein the initial tangential angle is greater than zero degrees, the final tangential angle is greater than zero degrees and said final tangential angle is greater than the initial tangential angle.

6. The midframe portion of claim 5, wherein the initial tangential angle and the final tangential angle are greater than 30 degrees.

7. A midframe portion of the gas turbine engine, said midframe portion comprising:
- a compressor section with a last stage blade configured to orient an air flow discharged from the compressor section at an initial tangential angle measured in an absolute reference frame with respect to a longitudinal axis of the gas turbine engine;
- a turbine section with a first stage blade configured to receive the air flow oriented at a final tangential angle measured in the absolute reference frame with respect to the longitudinal axis;
- a manifold configured to directly couple the air flow from the compressor section to a combustor head of the gas turbine engine; and
- a means for introducing an offset angle in the air flow from the initial tangential angle to the final tangential angle such that the initial tangential angle is at least maintained or augmented, said means being positioned within the manifold and downstream of the compressor section and upstream of the turbine section.

8. The midframe portion of claim 7, wherein the means for introducing the offset angle is the combustor head.

9. The midframe portion of claim 7, wherein the manifold takes a straight tubular form.

10. The midframe portion of claim 9, wherein the manifold is a diffuser, and wherein said diffuser is oriented at the initial tangential angle to receive the air flow from the compressor section.

11. The midframe portion of claim 10, further comprising a transition downstream of the combustor head; wherein the transition is oriented at the final tangential angle, to receive the air flow oriented at the final tangential angle from the combustor head, to pass the air flow to the first stage blade of the turbine section.

12. The midframe portion of claim 9, wherein a face of the manifold is parallel with a face of the combustor head, and wherein an outer diameter of the manifold is greater than an outer diameter of the combustor head at an interface of the manifold and the combustor head.

13. A midframe portion of the gas turbine engine, said midframe portion comprising:
- a compressor section with a last stage blade configured to orient an air flow discharged from the compressor section at an initial tangential angle orthogonal to a radial direction at an outlet of the compressor section;
- a turbine section with a first stage blade configured to receive the air flow oriented at a final tangential angle orthogonal to a radial direction at an inlet of the turbine section;
- a manifold configured to directly couple the air flow from the compressor section to a combustor head of the gas turbine engine;
- wherein the combustor head is for introducing an offset angle in the air flow from the initial tangential angle to the final tangential angle such that the initial tangential angle is at least maintained or augmented, said combustor head being positioned within the manifold and downstream of the compressor section and upstream of the turbine section.

14. The midframe portion of claim 13, wherein said initial tangential angle is based on a radial height of an outlet of the compressor section and a radial height of the combustor head; wherein said final tangential angle is based on a radial height of an outlet of a transition downstream of the combustor head and the radial height of the combustor head.

15. The midframe portion of claim 13, further comprising a transition downstream of the combustor head, said transition taking a straight tubular form and aligned at the final tangential angle to receive the air flow oriented at the final tangential angle from the combustor head; wherein the manifold is a diffuser taking a straight tubular form oriented at the initial tangential angle to receive the air flow from the compressor section.

* * * * *